United States Patent [19]

Segal et al.

[11] 4,015,039

[45] Mar. 29, 1977

[54] FIBROUS DISPERSION AID FOR THERMOPLASTICS

[75] Inventors: Leon Segal, Morristown; Albert H. Steinberg, Morris Plains, both of N.J.

[73] Assignee: Allied Chemical Corporation, Morris Township, N.J.

[22] Filed: Sept. 2, 1975

[21] Appl. No.: 609,463

Related U.S. Application Data

[62] Division of Ser. No. 375,430, July 2, 1973, Pat. No. 3,931,094.

[52] U.S. Cl. .......................... 428/297; 106/193 R; 260/37 R; 260/42.14; 264/136; 428/303; 428/325; 428/332; 428/337; 428/426
[51] Int. Cl.² ...................... B32B 5/26; B32B 5/28
[58] Field of Search .......... 428/297, 300, 301, 302, 428/337; 264/136, 137; 260/42.14, 37 R; 106/193

[56] References Cited

UNITED STATES PATENTS

| | | | |
|---|---|---|---|
| 2,339,431 | 1/1944 | Slayter | 156/148 |
| 3,338,777 | 8/1967 | Irwin et al. | 156/148 |
| 3,503,919 | 3/1970 | Cadus et al. | 260/37 R |
| 3,639,331 | 2/1972 | Hattori et al. | 260/42.14 |
| 3,664,909 | 5/1972 | Ackley | 428/303 |

Primary Examiner—James J. Bell
Attorney, Agent, or Firm—Roger H. Criss; Patrick L. Henry

[57] ABSTRACT

The addition to filled thermoplastic resin systems of small amounts of fibrous material, of aspect ratio at least about 10 times the aspect ratio of the filler, facilitates dispersion and processing of these filled compositions into shaped articles and gives a product exhibiting superior surface properties.

11 Claims, No Drawings

FIBROUS DISPERSION AID FOR THERMOPLASTICS

This is a division of Application Ser. No. 375,430, filed July 2, 1973, now U.S. Pat. No. 3,931,094.

BACKGROUND OF THE INVENTION

This invention relates to an improvement in the processing of filled thermoplastic resins into shaped articles by the addition of a dispersion aid in the form of small amounts of fibrous materials having an aspect ratio at least about 10 times that of the filler.

The addition to molding compositions of quantities of up to about 80% particulate fillers is known in the thermoplastic art. The use of these fillers offers many advantages such as improved stiffness, thermal and dimensional stability, or improved mechanical properties and includes as well the benefit from diluting the polymer to produce a more economical product. However, when amounts of filler in excess of about 15% are employed, difficulties in processing techniques arise. According to the amount of filler present, it becomes increasingly difficult to thoroughly disperse the filler as well as to feed or extrude it, and excessively high power requirements are often necessary to effect processing. In many applications where relatively high amounts of filler are used, it may be necessary to process mixtures more than once to obtain suitable homogeneity, e.g, in order to produce a mixture containing greater than about 50% filler using conventional techniques it is often necessary to first combine all the resin with half the filler, extrude or otherwise process this mixture and then add the remaining filler and reprocess the mixture to effect proper dispersion. Not only is this process awkward and time consuming, but it requires a large amount of extra mixing equipment.

Alternatively, expensive processing equipment such as continuous Banbury mixers, etc. may be used. The use of screw extruders with very high compression ratios to blend highly filled mixtures, causes significant wear on the extruder and the products often contain deleterious amounts of material from the screw and barrel. During processing, undispersed material may accumulate in dead spots in the equipment, e.g. behind the breaker plates, etc. The undispersed particles may also accumulate in the screen area of the equipment causing clogging of the screens which will slow down or completely stop processing operations and may result in a poorer quality product. In some cases, water is added to help densify and disperse the mixtures, but this procedure is not always effective and it is necessary to remove the water after dispersion has been completed; in addition, some polymers are sensitive to moisture e.g. polyamide and polyesters, and can hydrolytically degrade in the presence of moisture at elevated temperatures.

It is also difficult to feed such highly filled thermoplastic compositions in the hopper and much physical manipulation is usually required to prevent bridging of the feed stock. The uneven feeding in the hopper also leads to uneven filling of the screw flights thereby causing surging at the outlet of the extruder.

Moreover, because of the difficulty of obtaining good mixing, the quality, uniformity and homogeneity of the product resulting from compounding of these highly filled systems is often very poor. Thus, the products formed therefrom often exhibit poor surface and mechanical properties characterized in part by agglomerated clumps of filler and the presence of voids.

The use of long glass fibers in quantities of about 10% or greater is known to reinforce filled and/or unfilled thermoplastic compositions as described in U.S. Pat. Nos. 3,419,517, 3,639,331 and 3,503,919 as well as in our co-pending application Ser. No. 327,284, filed Jan. 29, 1973. The reinforced thermoplastic thus produced using long glass fibers are usually in sheet form and are adapted for use only in molding apparatus since the reinforcing advantages of these long fibers are lost during any melt processing techniques due to fiber breakup. It is also possible to use short glass fibers as fillers but when used in large amounts, the economical advantages inherent in the use of fillers as dilutants are lost.

The addition of small amounts of fibrous reinforcement is also known in the art, however, it has been found that such amounts often lower the mechanical strength of the composites. This is because fibrous reinforcement must be present in at least a certain critical minimum amount to be able to function as a load-bearing agent and at concentrations below this amount, fibers often stiffen the matrix without strengthening it. The "critical" or minimum loading level below which no strengthening is achieved is on the order of about 6 to 15% by total weight of the composites.

There is thus a need for an economical improved filled thermoplastic composition adaptable to easier melt processing and which will provide a filled thermoplastic product which can be extruded to produce articles possessing superior homogeneity, quality and uniformity.

There is also a need for a method for thoroughly dispersing large quantities of filler in thermoplastic compositions in a one-step processing operation.

SUMMARY OF THE INVENTION

In accordance with the procedure of the present invention, the processability of highly filled thermoplastic compositions, which can be formed under heat and pressure and which have at least 15% by weight filler, is improved by combining the polymer, filler and a dispersion effecting material consisting essentially of 0.5 to 15%, preferably 1 to 5% by weight, fibrous material having an aspect ratio at least about 10 times the aspect ratio of the filler and intimately blending the resultant mixture.

We have found that the addition to highly filled thermoplastic of these small amounts of fiber markedly facilitates dispersion of the filler in the thermoplastic compositions, removes the difficulties associated with additional melt processing, facilitates handling and feeding of the "dry blend" in hoppers, conveyors, etc., prevents bridging in the hopper and also causes less strain on the conventional mixing and extruding equipment.

The fibrous dispersion aid is usually added in amounts 0.5 t 10% by weight of the entire composition. Amounts of up to about 15% may be used but the advantage would be offset by cost; thus for reasons of economy, an amount of less than 10%, preferably about one to five percent is preferred.

Another advantage to the incorporation of small amounts of the dispersion effecting fiber within the filled thermoplastic in addition to providing greater homogeneity and uniformity, is that since the fibers help densify the product, the final product will thereby be more homogeneous and will contain less voids and then a comparable filled thermoplastic which does not contain the fibrous dispersion aid. Although the average size range of the particles used as fillers varies from about 0.5 to 10 u or higher, the actual sizes may vary from about 0 to about 300 u. We have found that the addition of these small quantities of the dispersion effecting fiber facilitates breakup of the larger filler particles. This filler breakup is apparent in photomicrographs or by visual inspection of filler thermoplastic compositions before and after the addition of the small quantities of fiber as disclosed herein.

Moreover, the addition of this small amount of dispersion fiber also helps to process the composite material in standard thermoplastic processing equipment such as extruders injection molders and the like, which would be used previously at best only with difficulty. Additionally, the dispersion fiber is beneficial in that it naturally helps in the handling and feeding of the composite mixtures, prevents bridging and hold-up in hoppers, feedscrews, bins, etc. and avoids strong wear on the processing equipment.

The process of the present invention is also useful for producing superior quality reinforced filled thermoplastic compositions. According to this aspect of the invention, a premix containing resin and filler is added to the extruder through a first inlet together with a small amount of long fibrous material. The long fibers function as dispersion effecting agents to thoroughly blend the filler and resin in the extruder. After the blending is completed, a reinforcing quantity of glass fibers are introduced through a second inlet located downstream in the extruder. Since there is no contact between fiber and unwetted filler and a short residence period for the glass fiber in the extruder, there is less breakage of the glass fibers than would be required to thoroughly blend, using conventional processes, a reinforced, filled composition and hence a superior quality, reinforced product is obtained.

DESCRIPTION OF THE PREFERRED EMBODIMENTS

In accordance with the procedure of this invention, small amounts of fibers usually in amounts of 0.5–15%, preferably 1–5% by weight of the total mixture may be employed. The amount and size of the dispersion effecting fiber for a particular composition employed is closely related to the particulate matter used in the filled composition. Fibers in amounts of 0.7–18% by weight of the filler are utilized; additionally, the aspect ratio of the fiber, defined as the length divided by the diameter (1/d), must be at least about 10 times the aspect ratio of the particulate filler. The fiber may comprise one of various materials possessing a modulus of at least $5 \times 10^5$ psi at the processing temperature of the thermoplastic. Such fibrous materials include glass or ceramic fiber, metal fibers such as steel, aluminum, copper, etc., whiskers such as boron, sapphire, etc., asbestos fibers, carbon fibers or synthetic fibers such as polyamide fibers.

It is significant to note that, in the practice of this invention that the dispersion effecting fibers do not serve as reinforcing agents and therefore the addition of these small quantities of fibrous material is to be distinguished from the addition of fibers as reinforcing agents as discussed previously. In order to provide any reinforcing advantages, it is necessary to use at least about 6%–20% are more practically 20%–30%, of minimum length about ⅛ inch. Moreover, when fibers are added for reinforcement, they are usually coated with coupling or sizing agents to facilitate bonding of the fiber to the resin matrix. In contradistinction thereto, the fibers used as dispersion aids in the manner of the present invention are preferably not bound to the matrix but are permitted to move freely therein. Furthermore, the addition of these small quantities of fibers will not deleteriously affect any important mechanical property of the composite.

The fibers can be added with the dry thermoplastic pellets and fillers and then processed. The fibers may also be fed into the mixing extruder or compounder at the feed throat, at a vent or at any similar opening. Optionally, thermoplastic pellets already containing glass fiber reinforcement could be added to the polymeric mixture in amounts such that the final product contains 0.5–15% long glass fiber as dispersing aid.

Adjuvants such as thixotropic agents, pH adjusters pigments, release agents, flame retardants heat and light stabilizers, etc. may be added to the composition in amounts less than about 1–2% of the inorganic material. However, it should be noted that when the fibrous dispersion aids of the present invention are utilized the amounts of other additives normally considered necessary to aid processing (e.g. lubricants anti-static agents, protective films, etc.) can be either decreased or often eliminated.

While previously it was usually necessary to add the resin and filler in powder for, so as to produce highly filled thermoplastic systems, in accordance with the method of this invention, because of the very pronounced mixing aid afforded by the dispersion effecting fiber, chips or pellets may also be used and thorough dispersion to insure a homogeneous, uniform product will be assured.

Suitable thermoplastic materials may be present in amounts of about 15–80% by weight and may comprise a wide range of polymeric compositions. Included, for example, are olefinic polymers such as polyethylene, polypropylene and copolymers and terpolymers thereof, e.g. copolymers of ethyl acrylate vinyl polymers comprising one or more of the following monomers: vinyl aryls such as styrene o-phenylstyrene, m-phenylstyrene, p-phenylstyrene, o-methylstyrene, m-methylstyrene, p-methylstyrene, o-methoxystyrene, m-methoxystyrene, p-methoxystyrene, o-nitrostyrene, m-nitrostyrene, p-nitrostyrene, and the like, vinyl and vinylidene halides, such as vinyl chloride vinylidene chloride vinylidene bromide and the like; vinylsters such as vinyl acetate, vinyl propionate, vinyl butyrate, vinyl chloroacetate, vinyl benzoate, and the like; polycarbonates, cellulosics such as cellulose acetate, cellulose triacetate, cellulose acetate butyrate, cellulose proprionate, ethyl cellulose, and the like; polyamides such as nylon 6,6 nylon 6, nylon 6, 10, poly-m-xylylene adipamide, polyhexamethylene terephthalamide, and the like; polyesters such as polyethylene terephthalate, polyethylene isophthalate, poly(ethylene-2, 7-naphthamate), polybutylene terephthalate, various copolymers thereof, and the like, chlorinated polyethylene or chlorinated polyvinyl chloride; polyfluorocarbons such as polytetrafluoroethylene, polytrifluorochloroethylene, and various copolymers and terpolymers thereof, as for example copolymers of vinylidene fluoride and trifluorochloroethylene, and the like.

Other thermoplastic polymers which can be utilized include polysulfone resins, polyacetal resin, halogenated olefins, and phenoxy resins. Also included in the term thermoplastic polymers are blends of two or more polymeric materials. Illustrative of such blends are polyethylene/polypropylene, ethyleneacrylic acid-vinyl acetate terpolymers, and the like. The term also includes the metallic salts of those polymers or blends thereof, which contain free carboxylic acid groups, examples of such polymers include ethyleneacrylic acid polymers and ethylenemethacrylic acid polymer. Illustrative of the metals which may be used to provide the salts of such carboxylic acid polymers are 1, 2 and 3 valent metals such as sodium, calcium, and aluminum.

The fillers used herein in conjunction with the fibrous dispersion aid in amounts of about 15–80% by weight, preferably 25–50%, may be selected from a wide variety of minerals, metals, metal oxides, siliceous materials, metal salts, and mixtures thereof. Examples of fillers included in these categories are alumina, aluminum hydrates, feldspar, asbestos, talc, calcium carbonates, clay, carbon black, quartz, novaculite, various polymorphs of silica kaolinite, bentonite, garnet, saponite, calcium oxide, calcium hydroxide, mica etc. The total amount of filler present in the mixture may also contain 0–50%, preferably 15–40% by weight of the total mixture glass filler which may be added to the wetted filled mixture prior to shaping as previously described. The fillers may be coated with sizing agents coupling agents adhesion promoters, wetting agents, and the like, as are known to those skilled in the art.

In many cases, a plate-like or acicular filler may have a relatively large aspect ratio of its own, even in this case, the fibrous dispersion aid must still possess an aspect ratio at least about 10 times that of the filler.

While every thermoplastic resin may possess one or more generic variety of filler which works best with that particular resin, the teachings set forth herein will apply regardless of which filler-resin combination is selected. It will be understood however, that the quality of the finished product will depend upon the filler chosen for use with each particular resin.

Any suitable commercial mixing apparatus may be employed to thoroughly blend the filled system. The time required for thorough mixing is variable but is generally in the order of 1 to 5 minutes. If the mixing time is too short, satisfactory blending will not be achieved; if the mixing time is too long, the glass fibers will break up and undesired clumps of filled resin will appear.

The resultant composition is a highly filled thermoplastic with mechanical properties superior to those possessed by previous highly filled compositions in which the filler was not so thoroughly dispersed. Moreover, the resultant filled composition will remain in a uniformly dispersed relationship throughout storage of the mixture and during any handling or molding required to produce a product from the composition. Such compositions can therefore be processed in any low or high shear equipment as required for the desired final product which might be floor tiles conductive polymers (with metal or carbon fillers), enchanced temperature or moisture resistant engineering compositions useful as gears, bearings, and the like, etc. Optionally, the resultant compositions might be subsequently reinforced, using low-shear methods, with long glass fibers to form a laminate comprising at least one layer of the filled thermoplastic composition of the invention and at least one layer glass mat formed of fiber lengths 1.5 inches or greater. Such laminates and methods for the shaping thereof are disclosed in U.S. Pat. Nos. 3,664,909 and 3,713,962 as well as in our co-pending application Ser. No. 327,284, filed Jan. 29, 1973 and U.S. Ser. No. 293,975 filed Oct. 2, 1972.

Alternatively, a filler premix comprising approximately 82–99.3% filler and 0.7–18% dispersion effecting fibrous material could be prepared and any suitable thermoplastic polymer could be subsequently added thereto.

While we do not intend to confine our invention to any particular theory, the following description is presented to further clarify the invention. The particular mechanism by which the dispersion effecting fibers act to increase or improve the homogeneous dispersion of filler and processability of the mixture is not entirely understood. However, it may be hypothesized that the short fibers in effect act as small "stirring rods" inside the extruder or during dry blending operations and hence may break-up and disperse agglomerations of filler particles. Another mechanism which may occur is the orientation of fibers in the processing machines i.e., injection molders extruders, etc. This orientation would thereby aid in achieving better mixing or dispersion. The ultimate effect of the improved dispersion and processability is a consequential superior homogeneity resulting in a substantial improvement in the surface properties of the final products.

The invention is illustrated by the following examples.

EXAMPLE I (COMPARATIVE)

A blend of 50% kaolin of average particle size 4 u was blended with nylon-6 pellets of average size ⅛inch × ⅛inch × 1/16 inch to yield a 50–50 mixture (by weight) of nylon and kaolin. This blend was dried in a vacuum oven at 100° C prior to extrusion.

The blend was fed to the hopper of a 1 inch "MPM" laboratory extruder equipped with a 3:1 compression ratio, 20:1 L/D single stage screw. Such a screw specification is often considered "standard" for many extruders. Thirty pounds of the 50–50 mixture was dumped into the feed hopper of the extruder. The extruder temperature was set at approximately 550°–600° F. along the entire length of the barrel and die. The die was a sheet die 6 inches wide with a 0.035 inch gap.

Physical manipulation was required to break up bridging in the hopper. Moreover, extrusion of this mixture was extremely difficult and varying amounts of power were required to operate the extruder as indicated by the surging recorded on an ammeter connected to the extruding system. When the operation was completed the extruder was disassembled and the flights of the screw were found to be coated with undispersed and unwetted kaolin. Additionally, agglomerated clumps of undispersed filler up to ¼inch (approx.) in diameter were noted in the extruder sheet. Variation in all extruder process conditions (i.e., screw, RPM, barrel temperature, die gap) did not improve the dispersion.

EXAMPLE 2

The procedure of Example 1 was repeated using the same materials named except that glass fibers of initial length ⅛inch (0.125inch) were added to the nylon 6-kaolin mixture as dispersion promoter so that the final composition was 50% kaolin, 47% nylon-6 and 3% glass fibers giving a total amount of inorganic material of 53% of the total mixture.

The extrusion process of Example 1 was repeated. No difficulties were encountered in the processing and the extrudate was now very uniform in appearance with no regions of undispersed material or voids observable. When the extruder was disassembled it was observed that the screw flights were coated with a uniform kaolin-resin dispersion.

EXAMPLE 3

The extruded composition of Example 2 was cut into sections one foot square. The cut sections were placed on either side of a continuous random glass mat material weighing approximately 1.5 oz ft$^2$. The glass mat consisted of strands containing approximately 40 filaments/strand, each filament being of 0.0004 inch diameter.

The tri-layer laminate was compression molded between the platens of a compression molding press at 100 psi and at a platen temperature of 270° C. in an infrared oven and stamped at 800 psi for 10 seconds in a deep drawing press which had a polished still die-set, maintained at 140° C., to produce 5 inch diameter cylindrical cups of excellent surface quality.

EXAMPLE 4

The composition of Example 2 was similarly blended and then fed into a Battenfeld 3 oz. capacity 75 ton injection molding machine. No difficulties were encountered during the injection molding operation and the resulting product had a homogeneous cross section and a superior uniform appearance with no observable voids.

EXAMPLES 5-7

The procedure of Example 2 was repeated in Examples 5, 6 and 7 varying the amounts of fibrous dispersion aid in each example. The results were presented in Table 1.

TABLE 1

| %Kaolin | %Nylon | %Fiber | Results |
|---|---|---|---|
| 50% | 45 | 5 | as in Ex. 2 |
| 50% | 49 | 1 | as in Ex. 2 |
| 50% | 49.5 | 0.5 | some undispered filler agglomeration evident (not as much as in Ex. 1) |

Properties were measured on the material of Examples 5-7 and on a 50-50 nylon-kaolin control prepared by "double-extrusion" techniques. All properties were essentially identical indicating that the presence of these small quantities of fibers do not significantly affect mechanical properties.

EXAMPLES 8-12

The procedure of Examples 1-7 was repeated, except that a 2½inches "HPM" (Prodex) extruder was used. A sheet die 24inches wide was used. Results were the same as in Examples 1-7.

EXAMPLES 13-17

The procedure of Examples 1-7 were repeated, except that a 4½inches HPM (Prodex) extruder with die size 24 inches wide was used. Results were the same as Examples 1-7.

EXAMPLES 18-20

The procedure of Example 2 was repeated using varying ingredients and proportions as shown in Table II.

| FILLER | RESIN | FIBER |
|---|---|---|
| 30% silica (4µ) | 68% polybutylene terephthalate | 2% alumina whiskers (200:1) |
| 66% CaCo$_3$ (14µ) | 30% polyethylene | 4% glass (300:1) |
| 25% talc and | 52% vinyl acetate | 3% silicon carbide fiber of aspect ratio 700:1 |
| 20% carbon black (0.05µ) | | |

Superior results were obtained as in Example 2.

EXAMPLE 21

The procedure of Example 2 was repeated using a mixture of 40% polypropylene, 58% kaolin which had been coated with stearic acid and Union Carbide A1100 aminosilane(½% by weight of kaolin of each component) and 2% glass fibers of length 1/20 inch. Results were similar to those in Example 2.

EXAMPLE 22

A high impact strength reinforced filled extruded product was prepared using the following technique. Approximately equal amounts nylon 66 and kaolin (4u) were introduced into the first inlet of a double vented extruder together with 3% by weight of the total mixture glass fiber dispersion promoter of length ⅛inch. After thorough blending of these materials in the extruder, approximately 20% by weight glass fiber of average length ⅛ inch were introduced into the second inlet. This tri-component blend was extruded through a strand die and pelletized. The final composition contained approximately 23% by weight glass fiber, of which approximately 3% glass fiber functioned as dispersion producing agents and facilitated processing in accordance with the present invention. The length of the remaining 20% glass fiber was still above the critical length necessary for reinforcement thereby providing a product characterized by superior impact strength.

EXAMPLE 23 (COMPARATIVE)

In order to illustrate the necessity of utilizing a fiber of aspect ratio at least about ten times that of the filler. Example 2 was repeated with the following exceptions. Milled glass fibers of length about 0.003 in. were prepared by selective screening and were used in amounts of 3% by weight was dispersion promoters in a 50-50 mixture of nylon 6 and kaolin (10 u average). Difficulties were encountered similar to those which occurred during the processing of the mixture of Example 1 which contained no glass fiber and the final product was of comparable inferior quality.

EXAMPLE 24

A filler premix was prepared by intimately blending a mixture of 97% $CaCO_3$ of size 14 u and 3% glass fiber of aspect ratio 300:1. The mixture was stored and subsequently combined with polytetrafluoroethylene in an amount such that the final composition contained 75% filler premix and 25% polymer. The mixture was thoroughly blended and shaped into pellets using injection molding equipment.

We claim:

1. A filled thermoplastic resin sheet formable by stamping under heat and pressure into shaped objects wherein the sheet is a laminate comprising:
   a. at least one layer of a filled thermoplastic composition comprising 15–80% filler and, as a dispersion effecting aid, 0.5–15% fibrous material having an aspect ratio at least about 10 times the aspect ratio of the filler and having a length of less than about 1/8 inch; and
   b. at least one layer of glass mat formed of fiber lengths of at least 1.5 inches in length.
2. The sheet of claim 1 wherein said layer (a) comprises 25–50% filler.
3. The sheet of claim 1 wherein a single layer of (b) is between two layers of (a).
4. The sheet of claim 1 wherein said thermoplastic polymer is nylon 6.
5. The sheet of claim 1 wherein said thermoplastic polymer is polyethylene terephthalate.
6. The sheet of claim 1 wherein said thermoplastic polymer is polybutylene terephthalate.
7. The sheet of claim 1 wherein said fibrous material of layer (a) is present in an amount of 1–5% by weight of the total mixture.
8. The sheet of claim 1 wherein said fibrous material is glass fiber.
9. The sheet of claim 1 wherein said fibrous material is alumina.
10. The sheet of claim 1 wherein said fibrous material is a synthetic polymeric material.
11. The sheet of claim 1 wherein said fibrous material and/or filler are coated with processing agents in amounts less than 2% of the total inorganic material.

* * * * *